F. V. SAMS.
FLOW INDICATOR.
APPLICATION FILED JAN. 2, 1920.

1,385,717.

Patented July 26, 1921.

UNITED STATES PATENT OFFICE.

FRED V. SAMS, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

FLOW-INDICATOR.

1,385,717.  Specification of Letters Patent.  Patented July 26, 1921.

Application filed January 2, 1920. Serial No. 349,656.

*To all whom it may concern:*

Be it known that I, FRED V. SAMS, a citizen of the United States of America, residing at Milwaukee, in the county of Milwaukee and State of Wisconsin, have invented a certain new and useful Improvement in Flow-Indicators, of which the following is a specification.

This invention relates in general to apparatus for indicating the presence or absence of flow of fluid through conduits, and has particular relation to apparatus of this general character of specific utility in indicating flow of lubricating fluid through the conduits of a lubricating system.

It is an object of this invention to provide indicating apparatus of simple and inexpensive construction of novel and improved design which is capable of readily indicating the presence or absence of flow of fluid through a conduit.

It is a further object of this invention to provide a novel and improved indicating apparatus of simple construction and design which is capable of indicating not only the presence or absence of flow of fluid in either direction through a conduit, but also to a certain extent, the rate of such flow.

These and other objects and advantages are attained by this invention, the various novel features of which will appear from the description and drawings, disclosing one embodiment of this invention, and will be particularly pointed out in the claims.

Figure 1:
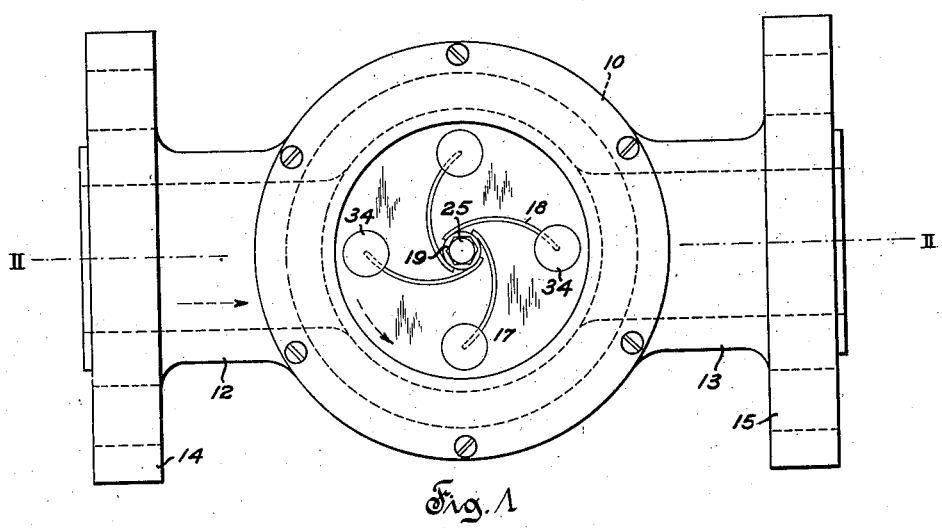
Figure 1 is a longitudinal elevation of an indicating apparatus embodying features of this invention.
Figure 2:
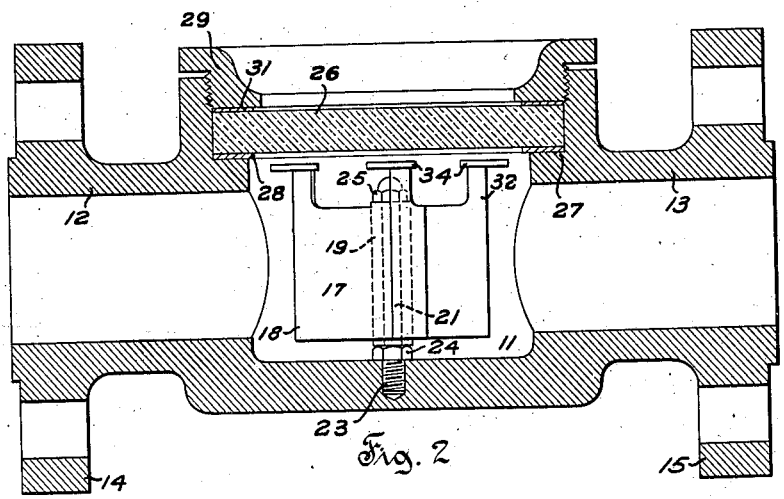
Fig. 2 is a longitudinal vertical section along the line II—II of Fig. 1, with the movable element of the device shown in the elevation.

In the embodiment of the invention disclosed, a casing 10 having a body recess 11 of generally cylindrical form, is provided with oppositely disposed, tubular extensions 12 and 13, each formed with means, such as perforated flanges 14, 15, respectively, for attaching or connecting the casing between pipes of a conduit. Within the cylindrical recess 11 of the casing 10, an indicator 17, in the form of a rotatable motor, is disposed in such manner as to be freely rotatable. In the embodiment disclosed, this motor comprises a plurality of vanes 18 of comparatively thin sheet material and generally curved in cross section, these vanes being brazed or otherwise secured to a centrally disposed tubular or sleeve-like element 19. The motor 17 is mounted in operative position by means of a pivotal stud 21, preferably secured in position by having its end threaded into the bottom of the casing 10, as indicated at 23, and held in position by means of a lock nut 24, engaging the wall of the casing. The sleeve 19 of the motor is freely rotatable upon the body portion of the stud 21 and is held in operative position thereon, as by means of a cap nut 25 on the stud. On removal of the cap nut, it will be apparent that the motor parts can be readily removed through the open side of the casing.

The open side of the casing 10 is closed by means of a transparent sight glass 26, held in position and clamped against an interior shoulder 27 of the casing 10 through the intermediary of a flexible washer 28, the clamping and holding effect being exercised upon the sight glass by a clamping collar or gland 29 having threaded engagement with an annular threaded portion of the casing 10, the pressure of the clamping collar being distributed by a flexible washer 31, inserted between these parts.

In the embodiment of the invention disclosed, it will be noted that the vanes, as they project outwardly from the supporting sleeve 19, are curved or bulged, the indicator being rotated by the action of fluid upon the concave sides of the vanes, the directions of flow and rotation being indicated by the arrows. This particular form of motor is such as permits maximum turning effect, due to the action of the fluid, while offering minimum impediment to such flow. It will be apparent that the motor is rotatable in the opposite direction from that indicated, when the direction of flow in the conduit is opposite to that indicated.

The axial length of the vanes 18 may conveniently be approximately the same as the diameter of the tubular extensions 12, 13, there being axially extending projections 32 adjacent the radially outer edges of the vanes. These projections 32 are provided at their ends with disk-like indicating elements 34 disposed at right angles to the bodies of the projections. These indicating elements 34 may be brazed or otherwise secured to the ends of the projections 32, or they may be formed integral with the vanes and bent over at an angle to the body portions of the vanes. These indicating elements are located close to the sight glass 26 and are preferably of such a color as to be relatively visible through the sight glass.

It will be apparent that when the indicator is connected in a pipe line, independently of whether the same extends in a vertical, horizontal or inclined direction, the motor indicating element 17 is set in rotation by the moving fluid, and the rate of rotation, as indicated by the speed of the disk-like elements 34 which are visible through the sight glass 26, is a fair measure of the amount of flow through the pipe line.

It will be apparent that the invention disclosed is such as produces a sight flow indicator of extremely simple design and construction, with its consequent small expense of production, and at the same time, one that is extremely efficient and capable of use for indicating not only the direction of flow of fluid, but also, to a great extent, the rate of such flow, the latter effect being indicated by the rate of rotation of the motor, the same varying directly as the volume of flow.

It should be understood that it is not desired that the invention claimed be limited to the exact details of construction shown and described, for obvious modifications will occur to persons skilled in the art.

It is claimed and desired to secure by Letters Patent:

1. A flow indicator, comprising a casing having a flow opening therethrough and a transparent window affording a view of the interior of the casing, and an indicating element within said casing comprising a rotary motor in the path of flow through the casing and having a plurality of vanes, at least one of said vanes being provided with a reduced extension having an indicating portion movable in close proximity to said transparent window to indicate the flow of fluid through said casing.

2. A flow indicator, comprising a casing having a flow opening therethrough and a transparent window affording a view of the interior of the casing, and an indicating element within said casing comprising a rotary motor in the path of flow through the casing and having a plurality of vanes, at least one of said vanes being provided with a reduced extension having an indicating portion disposed at an angle to the body portion of said vane and movable in close proximity to said transparent window to indicate the flow of fluid through said casing.

3. A flow indicator, comprising a casing having a flow opening therethrough and a transparent window affording a view of the interior of the casing, and an indicating element within said casing comprising a rotary motor in the path of flow through said casing and having a plurality of vanes, at least one of which is provided with an extension having an indicating portion at an angle to the body portion of said vane and movable in close proximity to said transparent window to indicate the flow of fluid through said casing.

4. A flow indicator, comprising a casing having openings affording flow therethrough and an open side, a removable transparent closure for said open side affording a view of the interior of the casing, an indicating element within said casing comprising a pivotal stud removably secured in said casing, and a rotatable motor element mounted on said stud and comprising a plurality of vanes in the path of flow through said casing at least one of said vanes being provided with a reduced axial extension having an indicating portion movable in close proximity to said transparent closure to indicate the flow of fluid through said casing.

5. A flow indicator, comprising a casing having a recessed body portion and openings affording flow therethrough and an open side, a removable transparent closure for said open side, and an indicating element within said casing in the path of flow therethrough, said indicating element comprising a pivotal stud removably secured at the rear side of the recessed body portion of said casing and a rotary motor comprising a tubular part rotatably mounted upon said stud, and a plurality of vanes secured to said tubular part and provided with reduced extensions adjacent their radially outer edges having indicating portions movable in close proximity to said transparent window to indicate the flow of fluid through said casing.

6. A flow indicator, comprising a casing having openings affording flow therethrough and a transparent window affording a view of the interior of the casing, an indicating element within said casing comprising a rotary motor having a plurality of vanes in the path of flow through said casing and provided with axially extending projections adjacent their radially outer edges, and indicating portions carried by said projections and visible through said window during rotation of said motor in response to the flow of fluid through said casing.

7. A flow indicator, comprising a casing having a flow opening therethrough and a transparent window affording a view of the interior of the casing, and an indicating element within said casing comprising a vaned turbine having a portion in the path of flow through the casing, one vane of said turbine having an axially extending projection adjacent its radially outer edge, and a disk-like indicating portion disposed at an angle to the body portion of said projection and movable in proximity to said transparent window.

8. A flow indicator, comprising a casing including a recessed body portion having an open side and entrance and outlet conduits communicating with the body portion, a removable transparent cover for said open side, and a rotatable indicating element comprising a vaned motor removably fixed in operative position within said recessed body portion independently of said cover and with its axis extending substantially parallel to the opening in said open side, vanes of said motor having reduced axial extensions and indicating portions associated therewith and visible through said transparent cover, and said motor being so disposed relative to said entrance conduit as to be rotated by fluid moving in a substantially radial direction against the vanes of the motor.

9. A flow indicator, comprising a casing having a flow opening therethrough, an indicating element within said casing comprising a vaned motor having a portion in the path of flow through the casing, and a transparent window in said casing, a vane of said motor having an indicating portion disposed at an angle to the body portion of said vane and movable in proximity to said transparent window to give a visible indication of the flow of fluid through said casing.

In testimony whereof, the signature of the inventor is affixed hereto.

FRED V. SAMS.